US006943674B2

(12) United States Patent
Tsai (10) Patent No.: US 6,943,674 B2
(45) Date of Patent: Sep. 13, 2005

(54) TIRE PRESSURE INDICATOR

(76) Inventor: Ching-Song Tsai, No. 13, Alley 2, Lane 251, Fou-Lin Road, Shihlin District, Taipei City (TW)

( * ) Notice: Subject to any disclaimer, the term of this patent is extended or adjusted under 35 U.S.C. 154(b) by 86 days.

(21) Appl. No.: 10/721,354

(22) Filed: Nov. 26, 2003

(65) Prior Publication Data

US 2005/0110622 A1 May 26, 2005

(51) Int. Cl.[7] ............................................. B60C 23/00
(52) U.S. Cl. ................. 340/442; 340/426.33; 73/146.2
(58) Field of Search ................... 240/426.33, 442–449; 116/34 A, 34 R; 73/146

(56) References Cited

U.S. PATENT DOCUMENTS

| | | | | |
|---|---|---|---|---|
| 3,710,314 A | * | 1/1973 | Bell et al. | 340/442 |
| 3,757,294 A | * | 9/1973 | Schultz | 340/442 |
| 4,437,504 A | * | 3/1984 | Stumpe | 152/427 |
| 4,619,137 A | * | 10/1986 | Bott | 73/146.5 |
| 5,798,689 A | * | 8/1998 | Huang | 340/447 |

\* cited by examiner

*Primary Examiner*—Jeffery Hofsass
*Assistant Examiner*—George Bugg
(74) *Attorney, Agent, or Firm*—Birch, Stewart, Kolasch & Birch, LLP (57) ABSTRACT

A tire pressure indicator includes a hollow annular pressure cell fixed fastened to the inner side of the rim for synchronous rotation, the hollow annular pressure cell having a diaphragm that displaces subject to the condition of the tire pressure of the tire, a contactless displacement sensor adapted to detect axial displacement of the diaphragm and to produce a corresponding modulated signal, a signal processor adapted to process the modulated signal from the displacement sensor into a tire pressure signal, a pressure display adapted to display the value of the tire pressure signal output from the signal processor, and a link tube connected between the hollow annular pressure cell and the tire to keep the internal air pressure of the hollow annular pressure cell in balance with the internal air pressure of the tire.

10 Claims, 10 Drawing Sheets

A-A Sectional View

TIRE PRESSURE INDICATOR

BACKGROUND OF THE INVENTION

1. Field of the Invention

The present invention relates generally to a tire pressure indicator adapted to monitor the condition of the tire pressure of a vehicle tire and, more particularly, to such a tire pressure indicator, which constantly monitors the condition of the tire pressure either when the car is running or stopped.

2. Description of the Related Art

The car driver may think that the engine is out of order if speed accelerating is slow and steering control requires much effort after having stepped the accelerator pedal. Actually, the problems may be caused due to insufficient tire pressure or deformation of the tires. If the tire pressure is excessively high, accelerating the speed becomes easy, however the car may vibrate heavily when running over an uneven road surface. Further, if the wheel diameters of the four tires of a car are not equal due to different tire pressures, the steering control of the car becomes difficult during a high speed running of the car, and a traffic accident may occur easily. Driving a car at a high speed when carrying a heavy load may cause the tires to explode if the tire pressure of each tire is insufficient or excessively high, and a catastrophe may follow.

According to a report on the analysis of traffic accidents during 1997~1999 prepared by Ministry of Transportation in Taiwan, 0.6% of 8369 cases were resulted from falling or explosion of car tire that caused 48 persons to death and 75 persons injured. These accidents have a great concern with abnormal tire pressure. Therefore, it is important to check the pressure of the tires before driving the car.

Conventionally, a static tire pressure gage is used and connected to the air valve of the tire to check the pressure of the tire when the car stopped. According to this conventional method, it is not possible to monitor the pressure of each tire during running of the car. Therefore, car driver must have the habit of checking the pressure of each tire before driving the car. Forgetting to check the pressure of each tire before driving the car may easily lead to a traffic accident. There are known tire pressure indicators that use a radio transmitter and receiver system with tire pressure gages to monitor the pressure of each tire of the car. According to this design, a respective pressure sensor and a respective radio transmitter are installed in each tire, and a radio receiver and display unit is provided inside the car to receive radio signal obtained from the pressure sensor at each tire by the corresponding radio transmitter. The radio receiver and display unit demodulates received signal into a corresponding tire pressure signal and displays the tire pressure signal through a display thereof. This radio system incorporated tire pressure indicator is still not satisfactory in function due to the following drawbacks:

1. Because the pressure sensor and transmitter are installed inside the tire or the air valve of the tire and use battery power for operation (battery power is limited by size), it is inconvenient to frequently replace the battery when power low.
2. During high-speed running of the car, the internal temperature of the tire becomes high, and the high temperature may affect the stability and reliability of the battery and the related circuit, and an accident may occur if the battery fails.
3. There are suppliers who have the system to output a warning signal only when the tire pressure excessively high or low and not to produce any signal when the pressure of the tire is within a normal range. According to this design, the user cannot know if the system functions well or not.
4. Every tire of the car must be encoded or provided with a particular carrier channel to prevent interference when using radio to send tire pressure signal. This arrangement greatly complicates the circuit design and increases the manufacturing cost of the system.
5. Under the power-save mode, the battery lasts for only about 5~6 months. It is complicated and expensive to frequently replace the battery.
6. A car tire is a rotor carrying a load for rotation at a high speed. However, adding tire pressure indicator parts to the tire changes the distribution of the mass of the tire. If the dynamic balance of the tire is not well controlled, the tire will vibrate severely during running. Leading to an explosion accident.
7. When replacing the tire or when the tire exploded, the pressure sensor and transmitter circuit of the tire pressure indicator may be damaged. Repair work and calibration of the pressure sensor and transmitter circuit is complicated and not easy.

Therefore, it is desirable to provide a tire pressure indicator that eliminates the aforesaid problems.

SUMMARY OF THE INVENTION

The present invention has been accomplished under the circumstances in view. It is the main object of the present invention to provide a tire pressure indicator, which constantly monitors the condition of the tire pressure either when the car is running or stopped. It is another object of the present invention to provide a tire pressure indicator, which indicates the tire pressure of the car tire individually.

To achieve these and other objects of the present invention, the tire pressure indicator is installed in one tire of a motor vehicle and adapted to indicate the tire pressure of the tire, comprising: a hollow annular pressure cell, the hollow annular pressure cell having one side fixedly concentrically fastened to an inner side of the rim of the tire, an opposite side provided with a diaphragm that displaces subject to the condition of the tire pressure of the tire; a displacement sensor mounted in the wheel axle holder supporting the tire and adapted to detect axial displacement of the diaphragm and to produce a corresponding modulated signal; a signal processor electrically connected to the displacement sensor and adapted to provide excitation signal to the displacement sensor and to process the output modulated signal from the displacement sensor into a corresponding tire pressure signal through a series of processing processes including demodulating, filtering, amplifying and scaling; a pressure display electrically connected to the signal processor and adapted to display the value of the tire pressure signal output from the signal processor; and a link tube connected between the hollow annular pressure cell and the tire to keep the internal air pressure of the hollow annular pressure cell in balance with the internal air pressure of the tire.

DETAILED DESCRIPTION OF THE INVENTION

Figure 1:
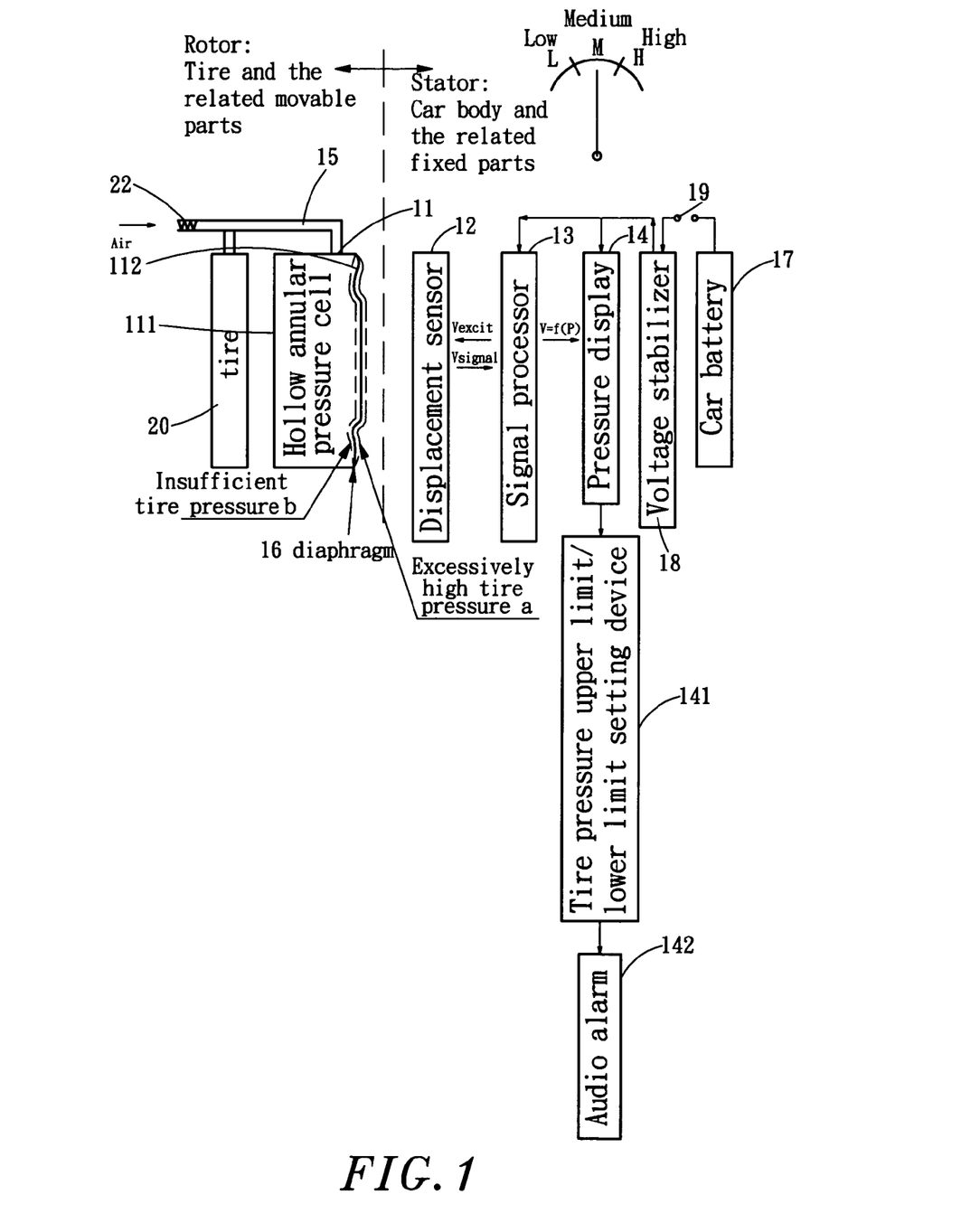
FIG. 1 is a system block diagram of the present invention.
Figure 2A:
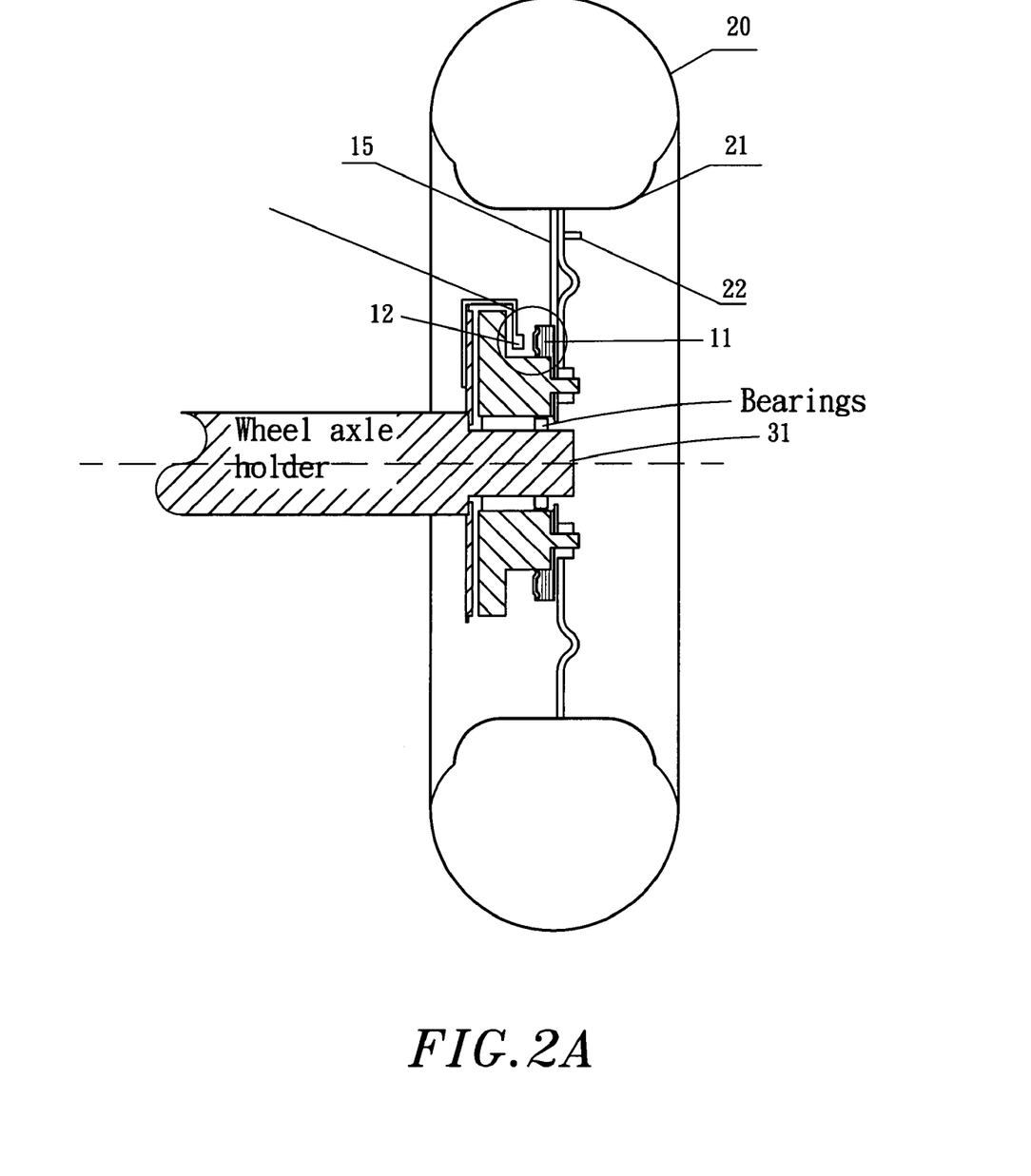
FIG. 2A is a schematic sectional view showing the relative positions of the hollow annular pressure cell and the displacement sensor according to the present invention.
Figure 2B:
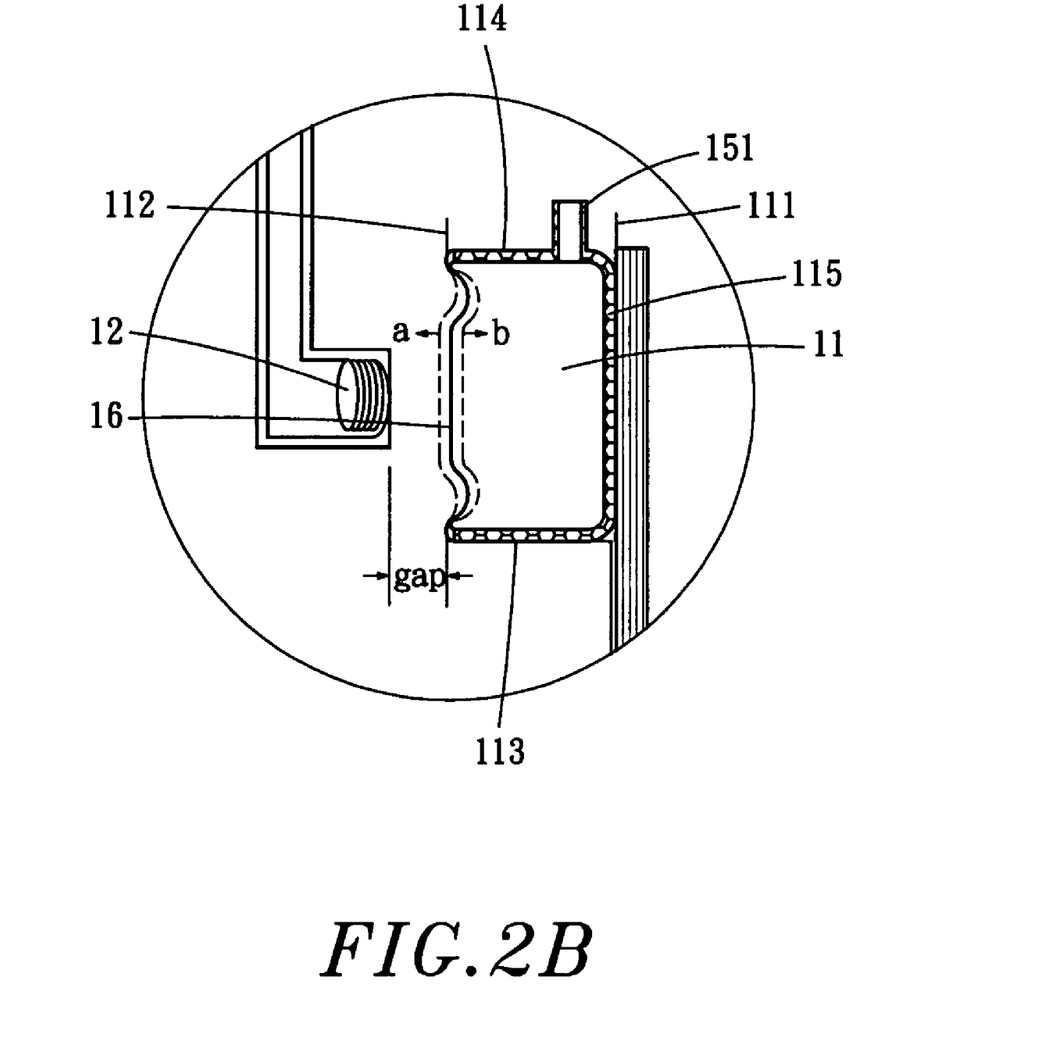
FIG. 2B is an enlarged view of a part of FIG. 2A.
Figure 3:
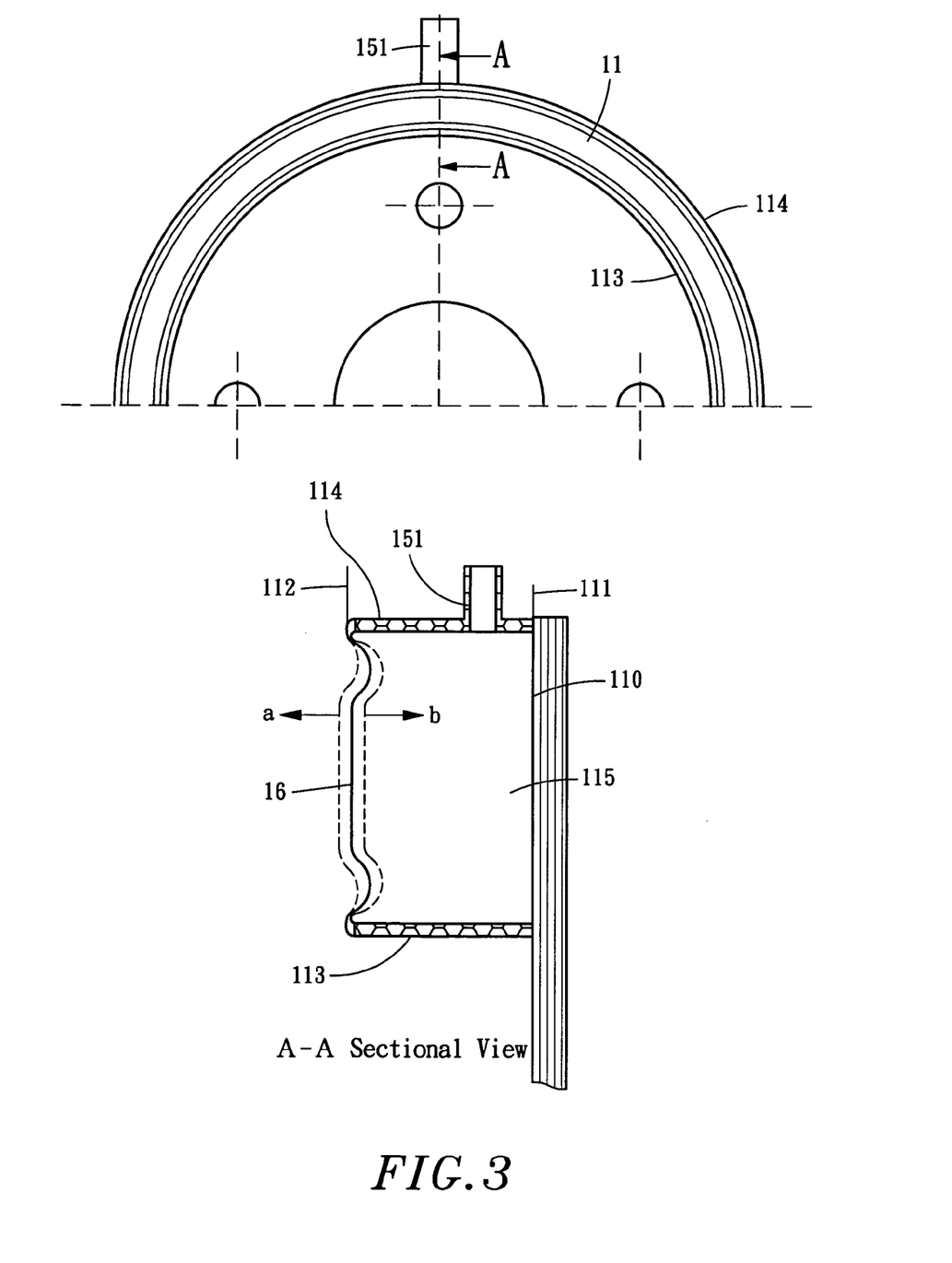
FIGS. 3 and 3A are schematic sectional views showing the structure of the hollow annular pressure cell according to the present invention.
Figure 3A:
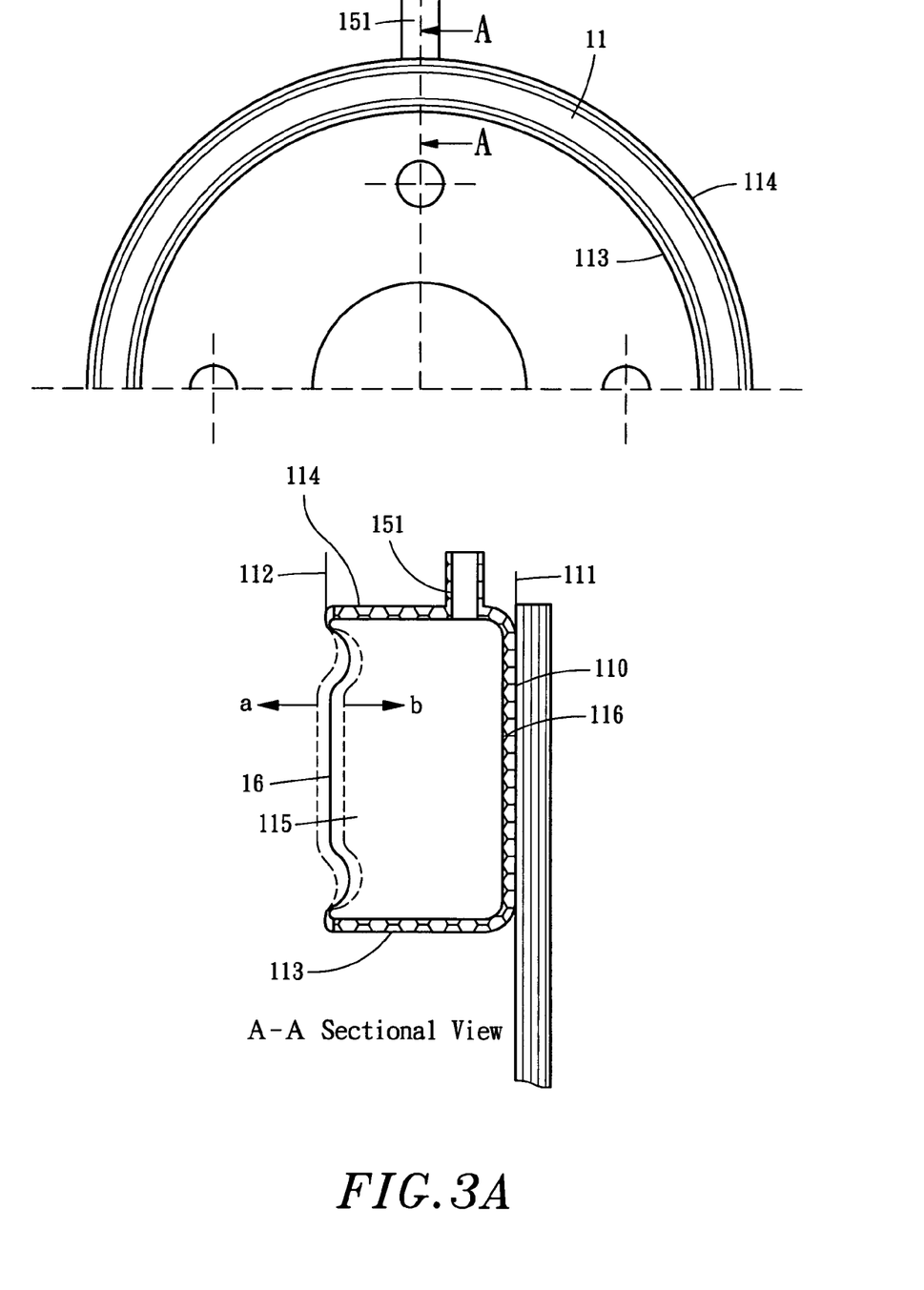
Figure 4:
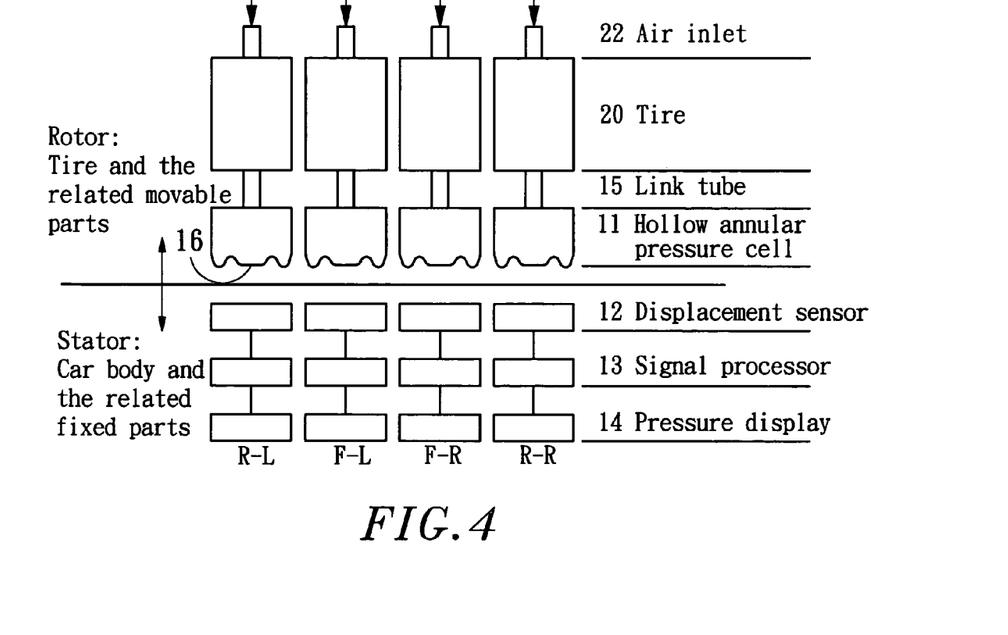
FIG. 4 is a block diagram showing four tire pressure indicators respectively installed in the four tires of a car according to the present invention.
Figure 5:
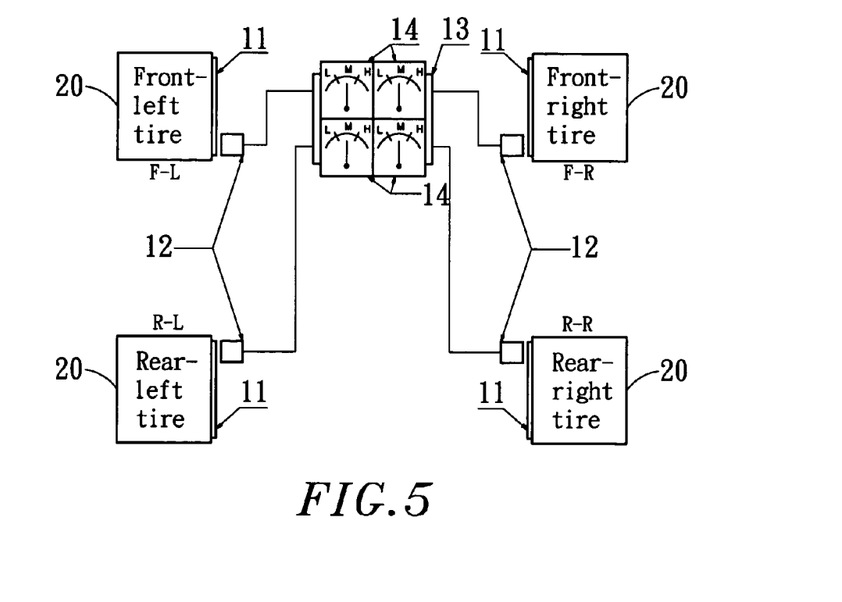
FIG. 5 is a schematic drawing showing the installation positions of four tire pressure indicators in a car according to the present invention.

Referring to FIGS. 1~3, a tire pressure indicator in accordance with the present invention is shown comprised of a hollow annular pressure cell 11, a displacement sensor 12, a signal processor 13, a pressure display 14, and a link tube 15.

Figure 6A:
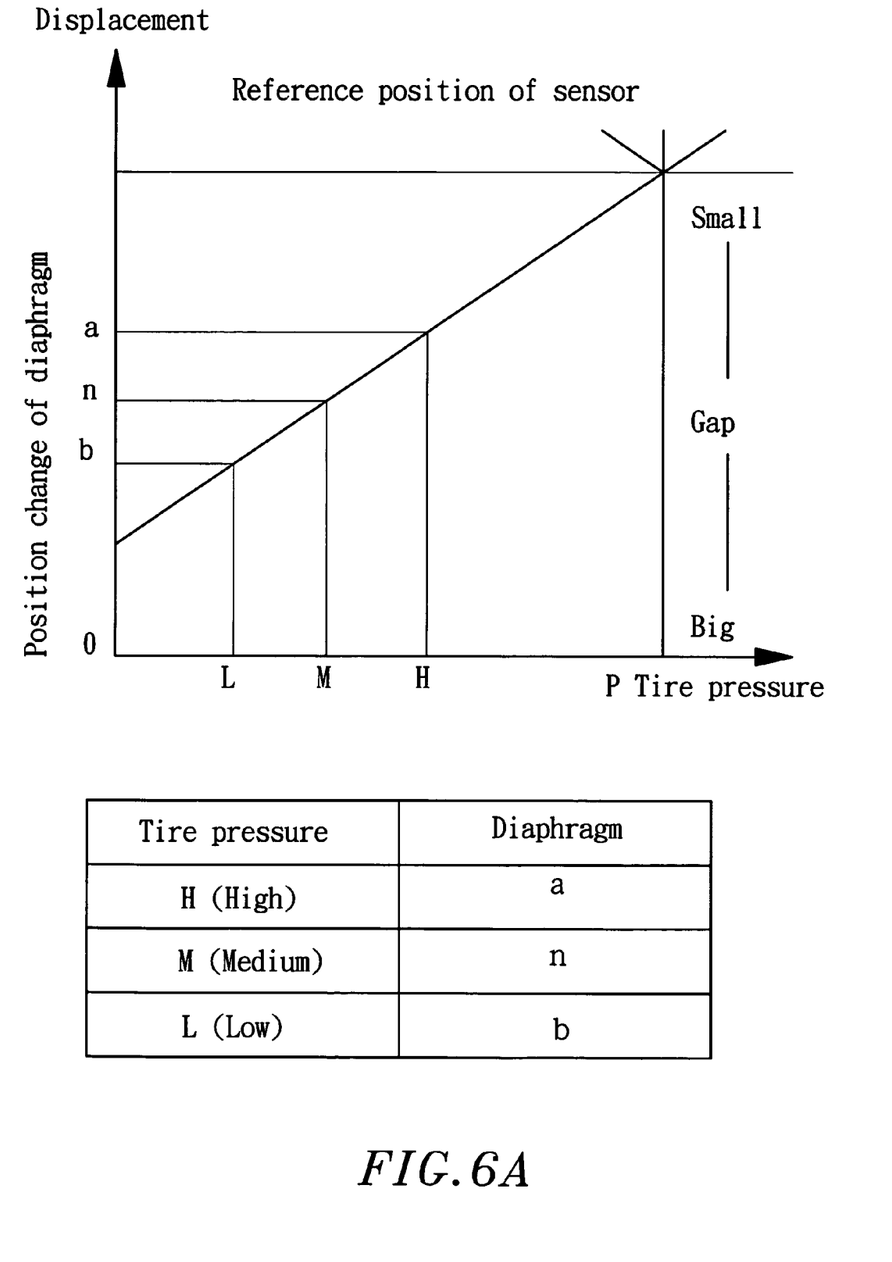
FIG. 6A illustrates the relationship between the tire pressure and the diaphragm according to the present invention.
Figure 6B:
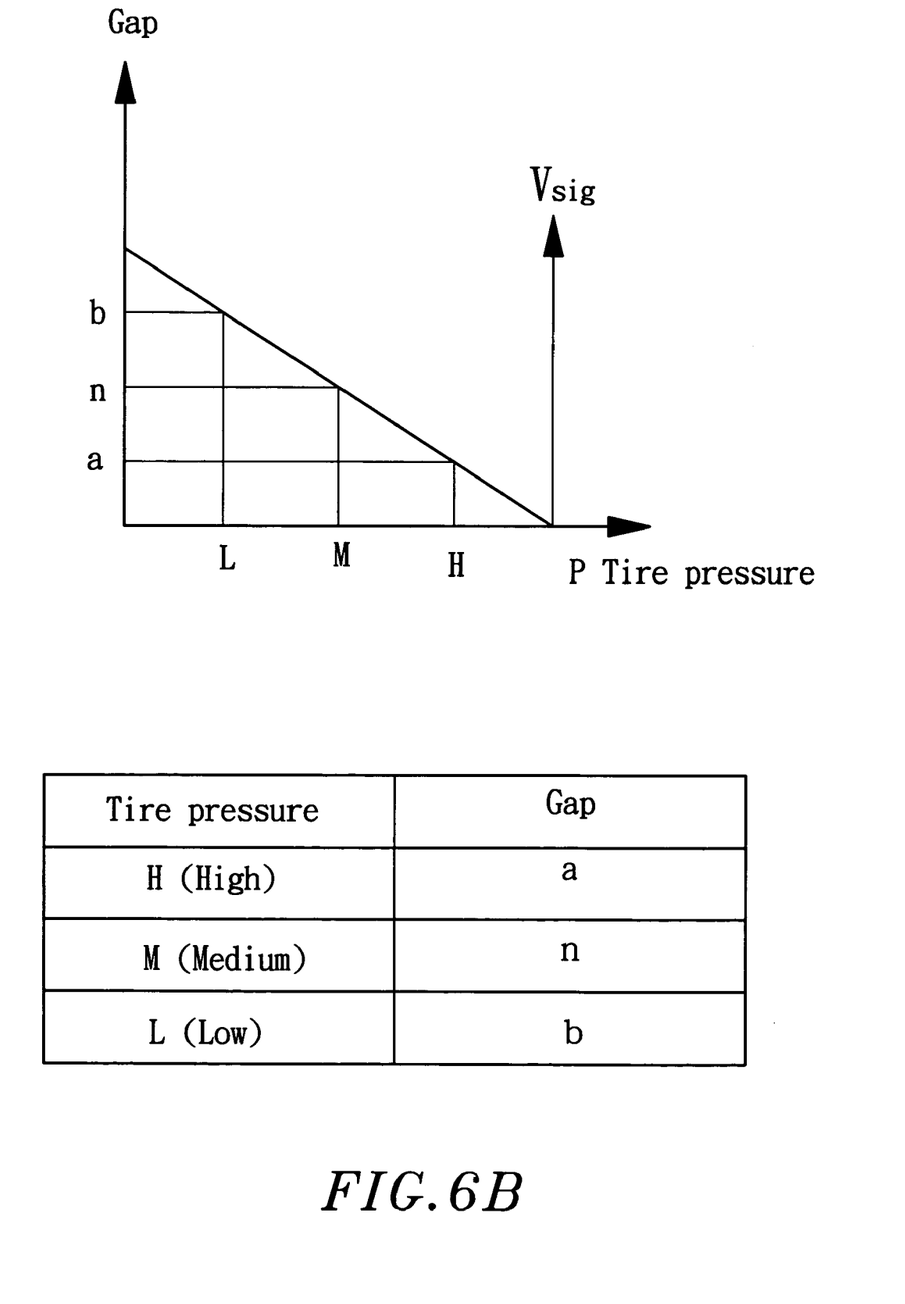
FIG. 6B illustrates the relationship between the tire pressure and the gap according to the present invention.
Figure 6C:
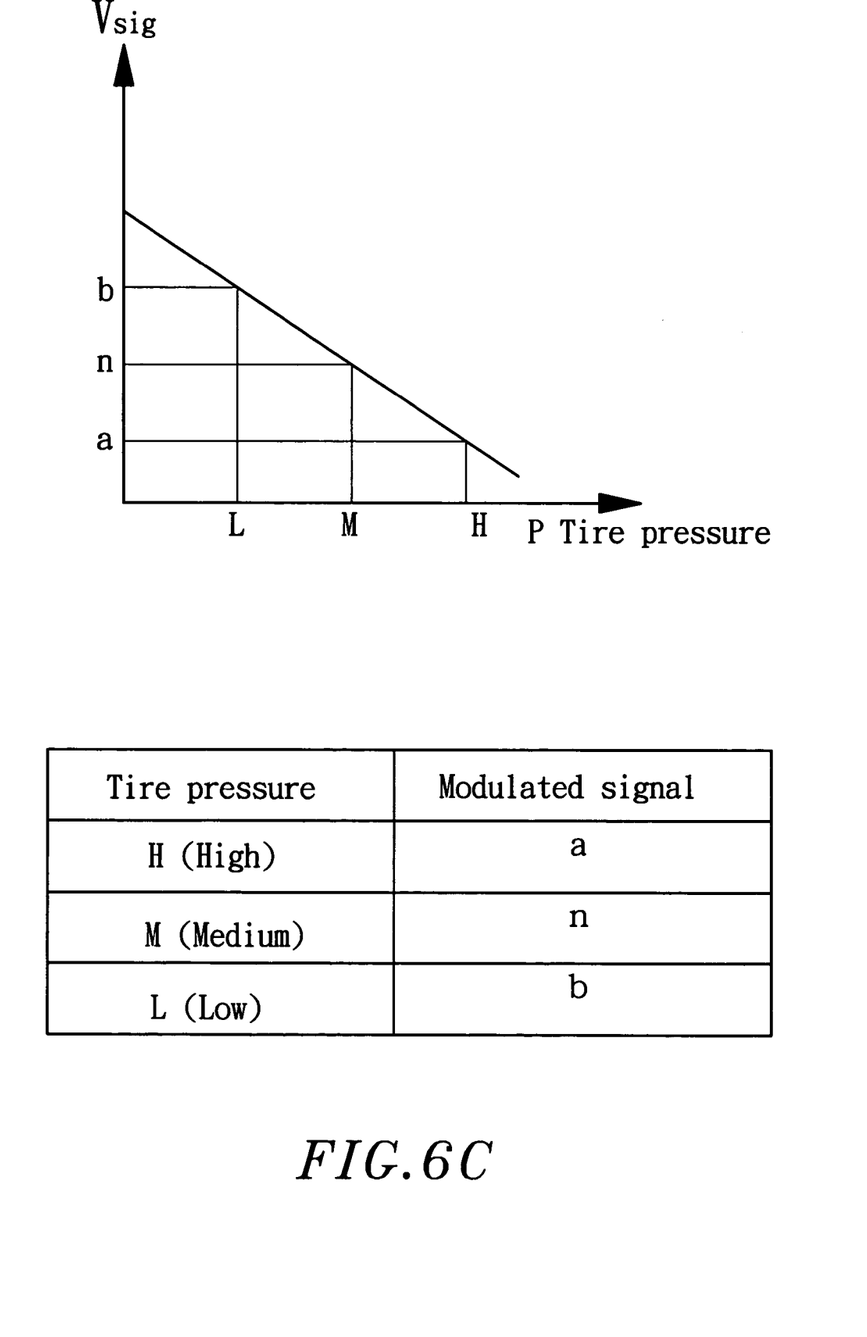
FIG. 6C illustrates the relationship between the tire pressure and the voltage of modulated signal according to the present invention.
Figure 6D:
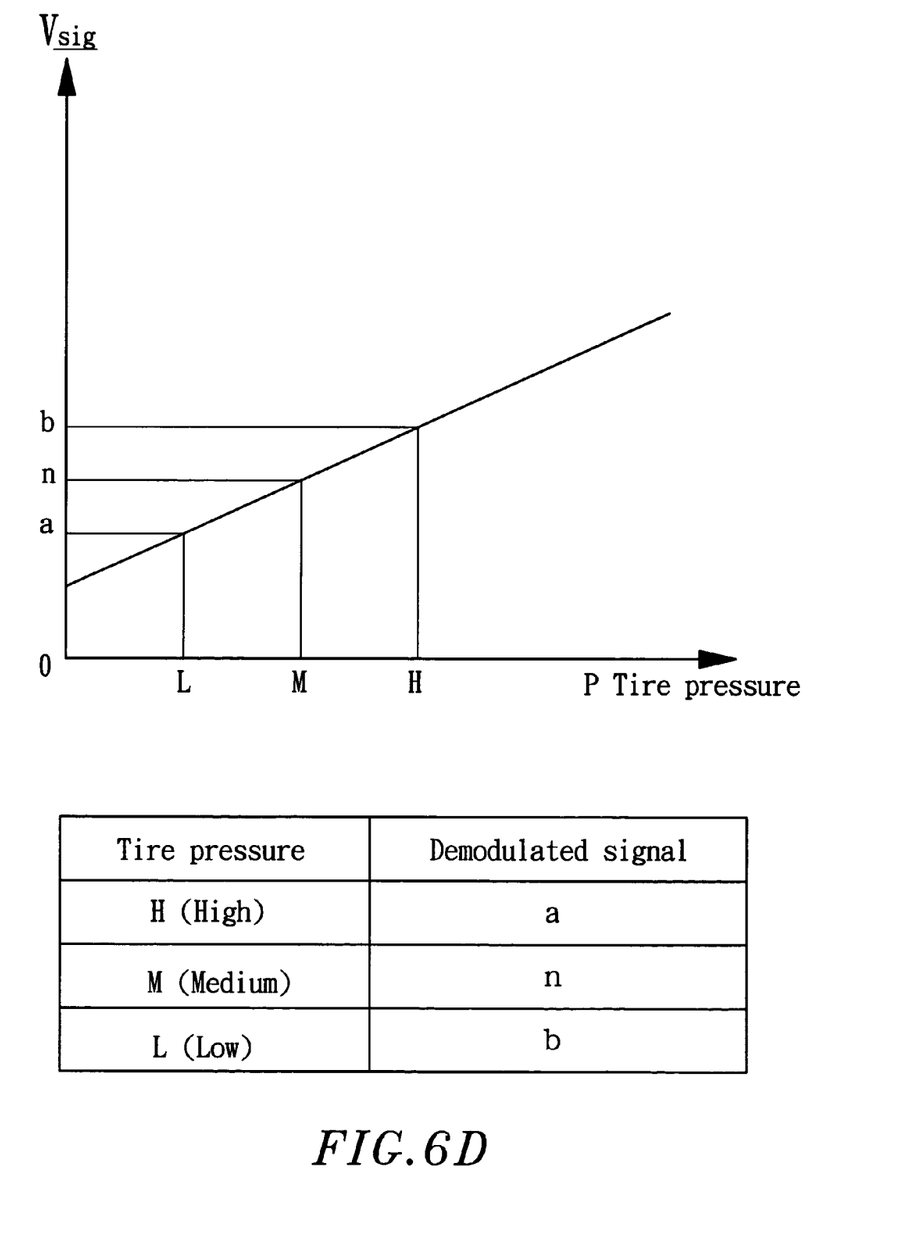
FIG. 6D illustrates the relationship between the tire pressure and the voltage of the demodulated signal according to the present invention.

The hollow annular pressure cell 11 has a mounting face 111 fixedly concentrically fastened to the rim 21 of the tire 20 for synchronous rotation, an inductive face 112 disposed opposite to the mounting face 111 and provided with a corrugated diaphragm 16 (see FIGS. 2A, 2B and 3). The link tube 15 connects the hollow annular pressure cell 11 to the air inlet 22 or a particular air passage of the tire 20, keeping the internal air pressure of the hollow annular pressure cell 11 in balance with the internal air pressure of the tire 20. Therefore, the diaphragm 16 moves axially subject to change of the tire pressure of the tire 20. When pressure is high, the diaphragm 16 moves in direction "a". On the contrary, when pressure is low, the diaphragm 16 moves in direction "b". Therefore, the position of the diaphragm 16 tells the tire pressure of the tire 20 (see FIG. 6A). Further, the displacement sensor 12 is fixedly fastened to the wheel axle holder 31 of the tire 20 (see FIGS. 2A and 2B) and spaced from the diaphragm 16 of the hollow annular pressure cell 11 by a small gap. When the tire pressure increased, the gap is relatively reduced. On the contrary, when the tire pressure reduced, the gap is relatively increased. Therefore, there is an indirectly proportional relationship between the tire pressure and the gap (see FIG. 6B). The displacement sensor 12 is a contactless type eddy current transducer, which is highly sensitive to the approach of metal. When the gap changed subject to the variation of the tire pressure, the signal processor 13 provides an excitation voltage to the displacement sensor 12, and therefore an amplitude modulation is produced due to an eddy current effect. The modulated signal is called $V_{sig}$. When the gap increased, the eddy current effect is weakened, and the modulated signal $V_{sig}$ is relatively increased. On the contrary, when the gap reduced, the eddy current effect is enhanced, and the modulated signal $V_{sig}$ is relatively reduced. Therefore, there is a directly proportional relationship between the modulated signal $V_{sig}$ and the gap; there is a linearly indirectly proportional relationship between the internal pressure of the hollow annular pressure cell 11 and the modulated signal $V_{sig}$ (see FIG. 6C). Further, the aforesaid signal processor 13 comprises an inverter adapted to demodulate the modulated signal $V_{sig}$ into a demodulated signal $V_{sig}$, which is directly proportional to the tire pressure P (see FIG. 6D). Therefore, the higher the tire pressure is the greater the signal will be; the lower the tire pressure is the smaller the signal will be. After a series of processing processed including demodulating, filtering, amplifying and scaling through the signal processor 13, the processed signal is output to the pressure display 14. The pressure display 14 can be installed in the instrument panel in front of the driver's seat to display the tire pressure by analog or digital. Therefore, when switched on the power switch 19 of the car battery 17, battery power supply from the car battery 17 is stabilized by a voltage stabilizer 18 and then supplied to the displacement sensor 12, the signal processor 13 and the pressure display 14.

When the tire pressure of the tire 20 changed, the diaphragm 16 produces a displacement in axial direction corresponding to the change of the tire pressure of the tire 20, and the displacement sensor 12 detects the distance of such a displacement and then transfers the detected signal to the signal processor 13 for processing. After processing, the signal processor 13 sends the processed signal to the pressure display 14, which shows the variation status of the tire pressure of the tire 20. Therefore, the user knows the status of the tire pressure of the tire through the pressure display 14 on time, and can immediately decide if to drive the car or not.

Further, a tire pressure upper limit/lower limit setting device 141 and an audio alarm 142 are connected in series to the pressure display 14. When the pressure of the tire surpassed the set upper limit value or dropped below the set lower limit value, the audio alarm 142 is immediately triggered to output an audible sound.

FIGS. 2A, 2B, 4 and 5 show four tire pressure indicators installed in a car. As illustrated, the hollow annular pressure cells 11 and the link tubes 15 are respectively installed in the four tires 20 of the car, the signal processors 13 are concealed in the gear box beneath the instrument panel, the pressure displays 14 are respectively disposed at the instrument panel (for example, at one lateral side of the instrument panel) where the driver can easily see the variation of the tire pressure of the respective tires displayed on the respective pressure displays 14.

Referring to FIG. 1 again, the tire pressure indicator further comprises a voltage stabilizer 18 provided in between and electrically connected to the pressure display 14 and the car battery 17 and the power switch 19 of the car. When the user switched on the power switch 19, the voltage stabilizer 18 stabilizes the voltage of battery power supply from the car battery 17, and then provides stabilized car battery power supply to the displacement sensor 12, the signal processor 13, and the pressure display 14.

Referring to FIGS. 2A, 2B and 3 again, the diaphragm 16 moves axially subject to the variation of the tire pressure. When the tire pressure increased, the diaphragm 16 protrudes outwards. On the contrary, when the tire pressure reduced, the diaphragm 16 curves inwards. The displacement sensor 12 produces a displacement detection signal indicative of the displacement of the diaphragm 16.

The aforesaid hollow annular pressure cell 11 may be formed integral with the inner side of the rim 21 of the tire 20, or separately made and then fixedly fastened to the rim 21 of the tire 20.

Further, the hollow annular pressure cell 11 can be made of wear resistant and weatherproof material (for example, stainless steel), having evenly distributed mass so that the dynamic balance between the hollow annular pressure cell 11 and the tire 20 can be calibrated at a time. The displacement sensor 12 is a contactless type inductive transducer (for example, magnetic inductor).

The invention has numerous advantages as follows:

1. The diaphragm 16 at the inductive face 112 of the hollow annular pressure cell 11 converts the tire pressure into corresponding a linear relation so that the tire pressure status can be known by means of using a contactless displacement sensor 12 to monitor the position of the diaphragm 16 without the use of any power-consuming circuit or sensor means.
2. Because the center of the hollow annular pressure cell 11 is at the wheel axle, the distribution of the mass of the hollow annular pressure cell 11 is symmetric, and the dynamic balance between the hollow annular pressure cell 11 and the tire 20 can easily calibrated at a time without any problem. Further, because the hollow annular pressure cell 11 is made of stainless steel or wear-resistant material and well protected by the rim 21 of the tire 20, it is free from damage of weather or impact and needs not to maintain.
3. Every tire 20 of the car is installed with an individual tire indicator having a respective signal line, preventing interference.
4. The displacement sensor 12 is a contactless sensor, which can be an inductive type, capacitive type, or magnetic type for choice.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A tire pressure indicator installed in one tire of a motor vehicle and adapted to indicate the tire pressure of the tire, the tire pressure indicator comprising:

a hollow annular pressure cell, said hollow annular pressure cell having one side fixedly concentrically fastened to an inner side of the rim of said tire, an opposite side provided with a diaphragm that displaces subject to the condition of the tire pressure of said tire;

a displacement sensor mounted in the wheel axle holder supporting said tire and adapted to detect axial displacement of said diaphragm and to produce a corresponding modulated signal;

a signal processor electrically connected to said displacement sensor and adapted to provide excitation signal to said displacement sensor and to process the outputted modulated signal from said displacement sensor into a corresponding tire pressure signal through a series of processing processes including demodulating, filtering, amplifying and scaling;

a pressure display electrically connected to said signal processor and adapted to display the value of the tire pressure signal outputted from said signal processor; and a link tube connected between said hollow annular pressure cell and said tire to keep the internal air pressure of said hollow annular pressure cell in balance with the internal air pressure of said tire.

2. The tire pressure indicator as claimed in claim 1, wherein said hollow annular pressure cell has an air hole adapted to accommodate one end of said link tube.

3. The tire pressure indicator as claimed in claim 1, wherein said hollow annular pressure cell is rotatable synchronously with said tire.

4. The tire pressure indicator as claimed in claim 1, wherein said hollow annular pressure cell comprises an annular mounting face an annular inductive face disposed in parallel to said annular mounting face, and one set of the tubular outer and inner wall supporting said annular mounting face and said annular inductive face, said tubular outer and inner wall having a peripheral edge sealed to said annular mounting face and said annular inductive face to form said hollow annular pressure cell and an air hole accommodating one end of said link tube.

5. The tire pressure indicator as claimed in claim 1, wherein said hollow annular pressure cell is comprised of said diaphragm, which is a corrugated member stamped from a thin sheet of stainless steel, a frame stamped from a thick stainless steel plate, and an annular mounting base, said diaphragm having a peripheral edge sealed to inner and outer walls of said frame and defining with said frame and said annular mounting base an annular air chamber.

6. The tire pressure indicator as claimed in claim 1, wherein said displacement sensor detects the position of said diaphragm upon high speed rotation of said hollow annular pressure cell with said tire and converts detected signal into corresponding tire pressure signal.

7. The tire pressure indicator as claimed in claim 1, wherein said hollow annular pressure cell is a pressure-to-displacement linear converter.

8. The tire pressure indicator as claimed in claim 1, wherein said displacement sensor is a contactless eddy current inductive sensor.

9. The tire pressure indicator as claimed in claim 1, wherein the air volume of said hollow annular pressure cell is $V_{air}=(R_o^2-R_i^2)\times\pi\times L_d$; $R_o$ and $R_i$ are radius of outer wall and inner wall of said hollow annular pressure cell; $L_d$ is the axial length of said hollow annular pressure cell and when the pressure changes in said hollow annular pressure cell, the value of change can be skip; the air volume change of said hollow annular pressure cell is an one-dimensional linear relation:

$$\Delta V_{air}=A\times\Delta L_d, \text{ or } \Delta L_d=A^{-1}\times\Delta V_{air};$$

$A=(R_o^2-R_i^2)\times\pi$, which is the cross sectional area of said hollow annular pressure cell that is a constant.

10. The tire pressure indicator as claimed in claim 1, wherein the position G of the diaphragm of said hollow annular pressure cell is linearly sensitive to the internal pressure P of said hollow annular pressure cell in axial direction, i.e., $P=K_1\times G$, $K_1=P/G$, $K_1$ is the coefficient of conversion or transfer ratio of said hollow annular pressure cell; said displacement sensor outputs a modulated signal $V_{sig}$ subject to the position G of said diaphragm, i.e., $G=K_2\times V_{sig}$, $K_2=G/V_{sig}$, $K_2$ is the coefficient of conversion or transfer ratio of said displacement sensor, so that:

$$P=K_1\times K_2\times V_{sig}=K\times V_{sig};$$

$K=K_1\times K_2=P/V_{sig}=P\times V_{sig}^{-1}$, k is the system transfer ratio or coefficient of conversion of the tire pressure indicator.

* * * * *